United States Patent Office 3,277,108
Patented Oct. 4, 1966

3,277,108
CERTAIN ARALKYL SYDNONIMINES
Hans Ulrich Daeniker, Reinach, Basel-Land, Switzerland, assignor to Ciba Corporation, New York, N.Y., a corporation of Delaware
No Drawing. Filed May 31, 1962, Ser. No. 198,701
Claims priority, application Switzerland, June 13, 1961, 6,897/61; Sept. 22, 1961, 11,069/61
7 Claims. (Cl. 260—307)

The present invention relates to new sydnonimines. More especially it concerns 3-(α-arylalkyl)-sydnonimines, their N-acyl and N-nitroso derivatives and, if desired, salts of said compounds.

The invention provides more especially compounds of the formula

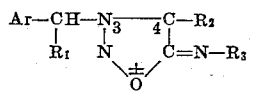

and if desired their salts, in which formula Ar represents an unsubstituted or substituted aryl radical; $R_1$ represents hydrogen or a lower alkyl radical, more especially methyl; $R_2$ stands for hydrogen, an alkyl radical, an unsubstituted or substituted aryl group or a halogen atom such as chlorine or bromine, and $R_3$ represents a hydrogen atom or an acyl group or the nitroso group.

Aryl groups are preferably mononuclear or dinuclear aryls, more especially phenyl groups.

As substituents for the afore-mentioned and possible further present aryl groups there may be mentioned, for example, hydroxyl groups, lower alkoxy groups such as methoxy, ethoxy, propoxy or butoxy groups, methylenedioxy groups, lower alkyls such as methyl, ethyl, propyl, isopropyl, branched or unbranched butyl, pentyl or hexyl groups which may be linked in any desired position, halogen atoms such as chlorine or bromine or the pseudohalogen trifluoromethyl. Alternatively, Ar may represent an aryl radical substituted by a residue of the formula

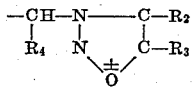

in which $R_4$ has the same meaning as $R_1$, and $R_2$ and $R_3$ have the above meanings.

Preferred alkyls are lower alkyl groups such as methyl, ethyl, propyl, or branched or preferably unbranched butyl, pentyl or hexyl groups.

An acyl radical is more especially a radical of an aliphatic or aromatic carboxylic acid, such as of a lower alkanecarboxylic acid, for example acetic, privalic, propionic, butyric or valeric acid, or of a benzoic, carbamic or thiocarbamic acid which may be unsubstituted or substituted as defined above for the aryl radicals, such for example as residues of acrylcarbamic or -thiocarbamic or alkylcarbamic or -thiocarbamic acid.

In addition to an analgesic and antipyretic action the new compounds posses good antiphlogistic and antiallergic properties and can, therefore, be used pharmacologically or as medicaments in human and veterinary medicine, for example as antirheumatics. They also have a long-lasting hypotensive action.

Special mention deserve the 3-(α-arylalkyl)-4-R-sydnonimines in which R represents hydrogen or an unsubstituted or substituted aryl group or halogen, and more especially those compounds in this group in which the aryl groups are phenyls and are unsubstituted or carry the substituents mentioned above for the aryl groups, as well as the N-acyl derivatives and the salts of said compounds.

Especially effective is the 3-benzyl-sydnonimine of the formula

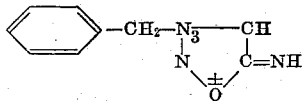

which is advantageously used in the form of a salt thereof.

The new compounds are obtained in known manner by treating an N-nitroso-(α-arylalkyl)-aminoacetonitrile with an acidic agent and, if desired, subjecting the resulting compound to a known acylation or nitrosation and/or halogenation.

Suitable acidic agents are organic and inorganic acids, for example the acids mentioned below, or Lewis acids. Particularly suitable are hydrohalic acids, preferably hydrochloric acid.

The reaction is carried out in known manner, in the presence or absence of a diluent and/or solvent such as water, an alcohol, for example methanol, or an ether such as diethyl ether or tetrahydrofuran, at room temperature or below or above it, under atmospheric or superatmospheric pressure.

The acylation of the sydnonimines is performed in known manner, for example by reaction with a carboxylic acid, preferably in the form of a functional derivative thereof. Functional acid derivatives are, for example, acid halides such as chlorides, pure or mixed anhydrides, for example mixed anhydrides with carbonic acid monoalkyl esters, such as carbonic acid monoethyl or -isobutyl ester, or, if desired, inner anhydrides such as isocyanates or isothiocyanates. The reaction is preferably carried out in the presence of an acid-acceptor such as an organic or inorganic base, for example pyridine or a carbonate or acetate of an alkali metal, in the presence or absence of a solvent and/or diluent, at room temperature or below or above it, under atmospheric or superatmospheric pressure.

The halogenation is achieved by reaction with a halogenating agent such, for example, as elemental chlorine or bromine, or with an agent giving off chlorine or bromine.

The reaction is carried out in the presence or absence of a diluent and/or condensing agent, in the case of the halogenation of the N-acyl sydnonimines for example in the presence of a basic agent, such as an organic or inorganic base, for example pyridine or an alkali metal carbonate, at room temperature or below or above it, under atmospheric or superatmospheric pressure.

The N-nitrosation is carried out in known manner, for example by treatment with a nitrosating agent such as a nitrite, for example an alkali metal nitrite such as sodium nitrite, in the presence of an acid, or a nitrous gas, preferably in the presence of a diluent or solvent and advantageously at a lower temperature.

Owing to the instability of the N-unsubstituted sydnonimines in the form of the free base, they are advantageously reacted in the form of their salts and under conditions such that the free base is only formed when necessary, and in such a case only immediately before proceeding to the reaction.

Depending on the reaction conditions used the new compounds are obtained in the form of the free bases or of their salts. In the form of the free base the sydnonimines unsubstituted at the imino group are relatively instable; accordingly, they are advantageously produced and used in the form of their salts. The N-acylated sydnonimines are stable both as free bases and as salts. It is highly surprising that the N-acyl derivatives of the sydnonimines form salts. The salts present advantages as compared to the corresponding free bases. In particular, they are more readily soluble in water and therefore easier to administer, and they are more stable than the free bases. They are, e.g. less sensitive to the influence of light or heat. The salts of N-acylsydnonimines therefore constitute a special object of the invention. From the salts the free bases can be obtained in known manner. From the latter salts can be prepared by reaction with organic or inorganic acids. As salt-forming acids there may be mentioned in particular those which are suitable for the formation of therapeutically useful salts, as for example: hydrohalic, sulfuric or phosphoric acids, nitric or perchloric acid; aliphatic, alicyclic, aromatic or heterocyclic carboxylic or sulfonic acids such as formic, acetic, propionic, oxalic, succinic, glycollic, lactic, malic, tartaric, citric, ascorbic, maleic, hydroxymaleic, dihydroxymaleic, or pyruvic acid; phenylacetic, benzoic, para-aminobenzoic, anthranilic, para-hydroxybenzoic, salicylic or para-aminosalicylic acid; methanesulfonic, ethanesulfonic, hydroxyethanesulfonic, ethylenesulfonic acid; toluenesulfonic or naphthalenesulfonic acids or sulfanilic acid; methionine, tryptophan, lysine or arginine.

The salts of the new compounds also serve for purifying the resulting bases by converting the bases into the salts, separating the latter and liberating the bases therefrom.

The starting materials are known or can be prepared by known methods.

In the processes mentioned, such derivatives of the starting materials may likewise be used as transform under the reaction conditions into the starting materials mentioned.

The invention includes also any variant of the process in which an intermediate obtainable at any stage thereof is used as starting material and any remaining step or steps is/are carried out; or in which the process is discontinued at any stage thereof; or in which the starting materials are formed during the reaction. Thus, for example, an (α-arylalkyl)-amino-acetonitrile can be treated in an acid solution with a nitrosating agent, such as a nitrous gas, whereupon the corresponding N-nitroso-(α-arylalkyl)-amino-acetonitrile is obtained as an intermediate which is then further reacted to furnish the sydnonimine.

The new compounds can be used as medicaments, for example as pharmaceutical preparations containing them or their salts in admixture or conjunction with an inorganic or organic, solid or liquid pharmaceutical excipient suitable for enteral, parenteral or local administration, more especially one that does not react with the new compounds such, for example, as water, gelatine, lactose, starch, stearyl alcohol, magnesium stearate, talc, vegetable oils, benzyl alcohols, gums, propylene glycol, polyalkylene glycols, white petroleum jelly, cholesterol or other known medicinal excipient. The pharmaceutical preparations may be, for example, tablets, dragees, ointments, creams or capsules, or in liquid form solutions, suspensions or emulsions. They may be sterilized and/or may contain assistants such as preserving, stabilizing, wetting or emulsifying agents, solution promoters, or salts for regulating the osmotic pressure, or buffers. They may also contain further therapeutically useful substances.

The pharmaceutical preparations contain advantageously about 5–95%, especially 30–90% of the active principle or about 10 to 200 mg., more especially 30 to 100 mg., of the active principle for every dosage unit. They are formulated by known methods.

The amount of excipient used may vary within wide limits and depends substantially on the route of administration.

The daily dose depends on the route of administration and on the individual requirements of the patient concerned and may easily be determined by the physician in attendance.

The following examples illustrate the invention without restricting its scope thereto.

EXAMPLE 1

116.5 grams of N-nitroso-benzylaminoacetonitrile are mixed at room temperature with 1 liter of methanolic hydrochloric acid; the clear solution is kept for ½ hour and then evaporated to dryness under vacuum at 40 to 50° C., to yield crude 3-benzyl-sydnonimine hydrochloride of the formula

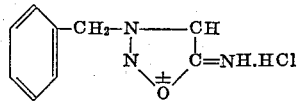

melting at 108–110° C. with decomposition. By recrystallisation from isopropanol the pure compound, melting at 124–125° C. with decomposition, can be obtained.

In identical manner there is obtained from N-nitroso-α-benzylamino-propionitrile the 3-benzyl-4-methylsydnonimine hydrochloride which melts at 137° C. with decomposition after recrystallisation from methanol+ether.

In an entirely anologous manner there can be prepared from N-nitroso-para-chlorobenzylamino-acetonitrile the 3-(para-chlorobenzyl)-sydnonimine hydrochloride which melts at 137–138° C. with decomposition on recrystallisation from methanol.

The starting material can be prepared, for example, in the following manner:

120 cc. of 7.5 N-aqueous hydrochloric acid are slowly stirred, while cooling, into a mixture of 94 grams of benzylamine and 58 grams of potassium cyanide in 200 cc. of water, and 70 grams of aqueous formaldehyde solution of 37–40% strength are then added dropwise. On completion of the addition, the mixture is stirred for 2 hours at room temperature, allowed to cool to 0° C., and while cooling, 120 cc. of 7.5 N-hydrochloric acid are stirred in, whereupon a solution of 62 grams of sodium nitrite in 100 cc. of water is slowly added dropwise to the suspension. After stirring for a short time at room temperature, the precipitated oil is taken up in ether, the ethereal solution is washed with water, dried over sodium sulfate and evaporated to dryness. The resulting oil is distilled in a high vacuum, to yield N-nitroso-benzylamino-acetonitrile as a yellow oil boiling at 109–111° C. under 0.1 mm. Hg pressure.

The N-nitroso-α-benzylamino-propionitrile which can be prepared in a similar manner except that acetaldehyde is used in place of formaldehyde, is a yellow oil boiling at 102–105° C. under a pressure of 0.1 mm. Hg.

In similar manner N-nitroso-parachlorobenzylamino-acetonitrile can be obtained as a yellow oil boiling at 140° C. under 0.1 mm. Hg pressure.

EXAMPLE 2

Dry hydrogen chloride gas is introduced into a cooled solution of 13.3 grams of N-nitroso-benzylamino-acetonitrile in 100 cc. of absolute ether. A precipitate consisting of dense colorless crystals forms which is suctioned off and recrystallized from isopropanol, to yield 3-benzyl-sydnonimine hydrochloride which is in every respect identical with the substance obtained as described in Example 1.

EXAMPLE 3

A freshly prepared solution of 10 grams of sodium bicarbonate in 100 cc. of water is added to a solution of 21.1 grams of 3-benzylsydnonimine hydrochloride in 100 cc. of water. After a few minutes a precipitate of colorless crystals forms spontaneously; it is suctioned off at 0° C. and dried, to yield 3-benzylsydnonimine hydrocarbonate in the form of analytically pure, colorless crystals.

When aqueous hydrochloric acid is added to the above salt, carbon dioxide is evolved and an aqueous solution forms which on evaporation under vacuum yields colorless crystals melting at 123° C. with decomposition, which are identical with the 3-benzylsydnonimine hydrochloride obtained as described in Example 1.

EXAMPLE 4

250 cc. of methanol, saturated with dry hydrochloric acid, are added at 0° C. to 24.3 grams of N-nitroso-α-benzylamino-phenylacetonitrile, and the mixture is kept for 30 minutes at room temperature. The clear solution is then evaporated to dryness at 30° C., to yield an oil which crystallizes slowly when it is left to itself. Recrystallization from 80 cc. of absolute alcohol yields 3-benzyl-4-phenylsydnonimine hydrochloride melting at 121–123° C. with decomposition, of the formula

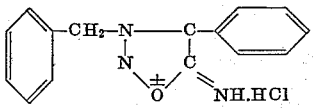

The starting material can be prepared, for example, as follows:

40 grams of benzaldehyde are stirred dropwise at 0° C. into a solution of 40 grams of benzylamine and 10 grams of anhydrous hydrocyanic acid in 200 cc. of water, and the mixture is then stirred for 2 hours at room temperature. The crystalline precipitate is suctioned off, rinsed with water and dried, to yield α-benzylamino-phenylacetonitrile melting at 30–32° C.

A solution of 25.1 grams of the above compound in 100 cc. of methanol is mixed with 12 cc. of concentrated hydrochloric acid, and a solution of 7.5 grams of sodium nitrite in 15 cc. of water is then stirred in dropwise at 0° C.; the whole is then stirred for 1 hour at 0° C. and then for 2 hours at room temperature. The precipitated oil is extracted with ether. The ethereal extract is dried and evaporated, to yield crude N-nitroso-α-benzylamino-phenyl-acetonitrile as a yellow oil which is further reacted as it is.

EXAMPLE 5

27.4 grams of N:N'-dinitroso-meta-xylylene-diamine-diacetonitrile are dissolved in 200 cc. of methanolic hydrochloric acid, the clear, red solution is kept for a few minutes at room temperature and then evaporated to dryness under vacuum at 30 °C. The residue, dissolved in 100 cc. of methanol, crystallizes in the refrigerator, to yield meta-xylylene-bis-(sydnonimine hydrochloride) in the form of colorless crystals melting at 145–148° C. with decomposition, of the formula

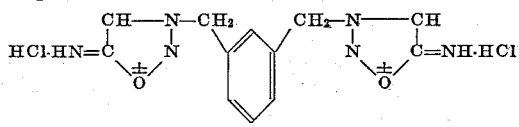

The starting material can be prepared, for example, as follows:

While stirring and cooling a solution of 68 grams of meta-xylylene-diamine and 65 grams of potassium cyanide in 200 cc. of water, 130 cc. of 7.92 N-hydrochloric acid and then 80 grams of an aqueous formaldehyde solution of 37–40% strength are stirred in dropwise. The whole is stirred for 2 hours at room temperature, and with further cooling first 130 cc. of 7.93 N-hydrochloric acid and then a solution of 70 grams of sodium nitrite in 200 cc. of water are stirred in dropwise. After another 30 minutes the resulting suspension is extracted with a large amount of chloroform. After drying and evaporating the chloroform solution there are obtained 144 grams of a yellow oil which crystallizes spontaneously and can be recrystallized from methanol, to yield N:N'-dinitroso-meta-xylylene-diamine-diacetonitrile in the form of colorless crystals melting at 74–75° C.

EXAMPLE 6

220 cc. of methanolic hydrochloric acid are added to 18.9 grams of N-nitroso-α-phenylethylaminoacetonitrile, and the resulting solution is evaporated under vacuum at as low a temperature as possible. The resulting oily residue is immediately dissolved in 100 cc. of isopropanol, filtered, and 150 cc. of ether are added to the filtrate. By keeping the mixture at −10° C. there are obtained 7 grams of 3-(α-phenylethyl)-sydnonimine hydrochloride melting at 80° C. with decomposition, of the formula

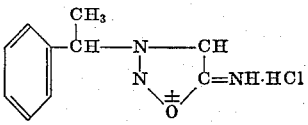

The starting material can be prepared in the usual manner (see Example 1) but, owing to its instability, it cannot be distilled and is therefore used in the crude form.

EXAMPLE 7

While cooling a suspension of 63 grams of 3-benzylsydnonimine in 300 cc. of absolute pyridine at 0–5° C., 35 grams of acetylchloride are stirred in dropwise and the whole is then stirred for 4 hours at 0° C. Thereupon 500 cc. of water and 80 grams of sodium bicarbonate are added, the whole is suction-filtered, and the filtrate is evaporated to dryness. The residue is recrystallized from 1.2 liters of water, to yield N-acetyl-3-benzylsydnonimine melting at 108–110° C., of the formula

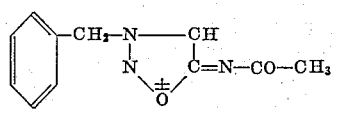

For preparation of the hydrochloride 9 grams of the base are dissolved in 100 cc. of absolute tetrahydrofuran. When dry hydrogen chloride gas is introduced at 0° C., the crystalline salt settles out and is recrystallized from methanol+ether, to yield N-acetyl-3-benzylsydnonimine hydrochloride in the form of colorless flakes melting at 97–99° C., with decomposition.

An alternative starting material is the 3-benzyl-sydnonimine hydrocarbonate prepared as described in Example 3; it leads in analogous manner to the N-acetyl-3-benzylsydnonimine described above.

In analogous manner 3-para-chlorobenzylsydnonimine hydrochloride yields N-acetyl-3-para-chlorobenzylsydnonimine melting at 158–159° C. with decomposition (from isopropanol); its hydrochloride decomposes at 124–125° C. after recrystallization from methanol+ether.

EXAMPLE 8

8.0 grams of benzylchloride are stirred dropwise into a suspension of 10.7 grams of 3-benzylsydnonimine in 50 cc. of absolute pyridine cooled to 0° C., and the whole is stirred on for 4 hours at 0° C. At the same temperature 200 cc. of water are added dropwise, whereupon a dense, crystalline precipitate forms. The reaction mixture is stirred for 1 hour at room temperature, suction-filtered, and the crystalline residue is recrystallized from 70 cc. of methanol, to yield N-benzoyl-3-benzylsydnonimine melting at 129–131° C. with decomposition, of the formula.

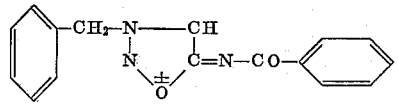

EXAMPLE 9

A solution of 7 grams of sodium nitrite in 200 cc. of water is stirred dropwise into a cooled mixture of 21.1 grams of 3-benzylsydnonimine hydrochloride in 200 cc. of water. The whole is stirred for 2 hours at 0° C. and then overnight at room temperature, suction-filtered, and the filter residue is dried; it forms yellow crystals melting at 116–117° C. Recrystallization from 300 cc. of methanol yields N-nitroso-3-benzylsydnonimine in the form of yellow crystals melting at 117° C. with decomposition, of the formula

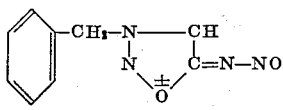

In analogous manner meta-xylylene-bis-(sydnonimine hydrochloride) yields meta - xylylene-bis-(N-nitroso-sydnonimine) which melts at 113–114° C., with decomposition after recrystallization from methanol.

EXAMPLE 10

Dry hydrogen chloride is introduced at 5° C. into a solution of 1 gram of N-nitroso-3-benzyl-sydnonimine in absolute tetrahydrofuran. Colorless crystals are formed spontaneously which are suctioned off and recrystallized from methanol+ether, to yield 3-benzyl-sydnonimine hydrochloride melting at 123–124° C. with decomposition; it is identical with the compound obtained as described in Example 1.

EXAMPLE 11

5 grams of sodium bicarbonate are stirred into a cooled solution of 10.6 grams of 3-benzylsydnonimine hydrochloride in 100 cc. of water, and 10 grams of phenylisocyanate are then slowly added dropwise. The whole is stirred for 4 hours at 0° C., 50 cc. of ether are added to the emulsion so obtained, which is stirred for 10 minutes and the precipitated crystals are then suctioned off and recrystallized from 1 liter of methanol, to yield 9.5 grams of N-phenylcarbamyl-3-benzylsydnonimine in the form of yellow crystals melting at 168–169° C. with decomposition, of the formula

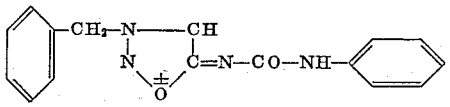

The hydrochloride, prepared in usual manner, can be recrystallized from isopropanol and begins to decompose unsharply at 180° C.

EXAMPLE 12

20 grams of N-nitroso-benzylamino-acetonitrile in 200 cc. of 2 N-hydrochloric acid are agitated at room temperature for several days, then washed twice with ether, and the aqueous solution evaporated to dryness in vacuo at room temperature. The crystalline residue is recrystallized from isopropyl alcohol to obtain 3-benzylsydnonimine-hydrochloride which melts and decomposes at 123–124° C. The product is identical with the compound obtained according to Example 1.

EXAMPLE 13

Capsules containing 3-benzylsydnonimine hydrochloride as active principle can be prepared by charging gelatine capsules in usual manner with a mixture containing:

|  | Mg. |
| --- | --- |
| 3-benzylsydnonimine hydrochloride | 100 |
| Magnesium stearate | 5 |
| Talcum | 20 |
| Per capsule | 125 |

EXAMPLE 14

A tablet containing 3-benzylsydnonimine hydrochloride as active principle may contain e.g. the following constituents:

|  | Mg. |
| --- | --- |
| 3-benzylsydnonimine hydrochloride | 100.0 |
| Wheat starch | 136.0 |
| Colloidal silicic acid with hydrolyzed starch | 15.0 |
| Gelatin | 3.0 |
| Arrowroot | 25.0 |
| Stearic acid | 9.0 |
| Talcum | 12.0 |
|  | 300.0 |

It can be prepared in the following manner:

3-benzylsydnonimine hydrochloride is homogeneously mixed with ⅔ of the wheat starch and ⅔ of the colloidal silicic acid with hydrolyzed starch, and the mixture passed through an 0.5 mm. mesh sieve. Gelatine is dissolved in the ten-fold quantity of water, ⅓ of the wheat starch suspended in twice its quantity of water and a mucilage prepared therefrom on the water-bath. The powder mixture is homogeneously moistened with the solutions of the binding agents and kneaded until a plastic mass is obtained which is then passed through a 3 mm. mesh sieve. It is dried at a temperature not exceeding 45° C. and then passed through a 1.5 mm. mesh sieve. The resulting granulate is admixed with arrowroot, stearic acid, talcum, and ⅓ of the colloidal silicic acid with hydrolyzed starch in a finely sieved form and, after renewed homogenization, compressed into tablets of 300 mg. and a diameter of 10 mm. in the usual manner.

What is claimed is:

1. A member selected from the group consisting of a sydnonimine of the formula

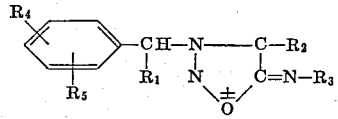

wherein $R_1$ stands for a member selected from the group consisting of hydrogen and lower alkyl, $R_2$ for a member selected from the group consisting of phenyl, hydroxyphenyl, lower alkoxyphenyl, methylenedioxyphenyl, lower alkylphenyl, halogenphenyl, trifluoromethylphenyl, halogen, $R_3$ represents a member selected from the group consisting of lower alkanecarboxylic acyl, benzoyl, and nitroso, $R_4$ represents a member selected from the group consisting of hydrogen, hydroxy, lower alkoxy, methylenedioxy, lower alkyl, halogen and trifluoromethyl and $R_5$ represents a member selected from the group consisting of hydrogen, hydroxy, lower alkoxy, methylenedioxy, lower alkyl, halogen and trifluoromethyl at least one of the substituents $R_4$ and $R_5$ being other than hydrogen, and an acid addition salt thereof.

2. A member selected from the group consisting of 3-(para-chlorobenzyl)-sydnonimine and an acid addition salt thereof.

3. A member selected from the group consisting of N-acetyl-3-para-chlorobenzyl-sydnonimine and an acid addition salt thereof.

4. A member selected from the group consisting of N-phenylcarbamyl-3-benzyl-sydnonimine and an acid addition salt thereof.

5. A member selected from the group consisting of a sydnonimine of the formula

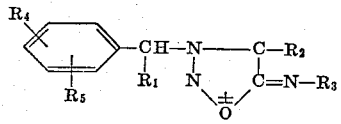

wherein $R_1$ stands for a member selected from the group consisting of hydrogen and lower alkyl, $R_2$ for a member selected from the group consisting of hydrogen, lower alkyl, phenyl, hydroxyphenyl, lower alkoxyphenyl, methylenedioxyphenyl, lower alkylphenyl, halogenphenyl, trifluoromethylphenyl, halogen, $R_3$ represents a member selected from the group consisting of lower alkanecarboxylic acyl, benzoyl, and nitroso, $R_4$ represents a member selected from the group consisting of hydrogen, hydroxy, lower alkoxy, methylenedioxy, lower alkyl, halogen and trifluoromethyl and $R_5$ represents the group of the formula

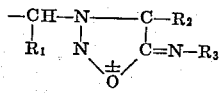

and an acid addition salt thereof.

6. A member selected from the group consisting of meta-xylylene-bis-(sydnonimine) and an acid addition salt thereof.

7. Meta-xylylene-bis-(N-nitroso-sydnonimine).

References Cited by the Examiner

UNITED STATES PATENTS

| | | | |
|---|---|---|---|
| 2,574,506 | 11/1951 | Sletzinger et al. | 260—465 |
| 2,809,983 | 10/1957 | Heininger | 260—465 |
| 3,073,839 | 1/1963 | Kano et al. | 260—307 |
| 3,074,957 | 1/1963 | Schaefer et al. | 260—307 |

OTHER REFERENCES

Kato et al., Chem. Abstracts, vol. 54, p. 511.
Vasil'eva et al., Chem. Abstracts, vol. 54, p. 8793.

ALEX MAZEL, *Primary Examiner.*

NICHOLAS S. RIZZO, HENRY R. JILES, *Examiners.*

A. D. ROLLINS, R. J. GALLAGHER,
*Assistant Examiners.*